United States Patent [19]

Carpenter

[11] Patent Number: 5,154,462
[45] Date of Patent: Oct. 13, 1992

[54] METHOD FOR MAKING A BONDED VEHICULAR CROSS MEMBER BUMPER BEAM FROM TWO MATERIALS

[75] Inventor: Ronald A. Carpenter, Dearborn, Mich.

[73] Assignee: Ford Motor Company, Dearborn, Mich.

[21] Appl. No.: 811,607

[22] Filed: Dec. 23, 1991

[51] Int. Cl.⁵ .............................................. B60R 19/08
[52] U.S. Cl. ..................................... 293/120; 156/292; 156/293; 156/304.2; 293/121; 293/122
[58] Field of Search ........................ 293/120, 122, 121; 156/304.2, 292, 293

[56] References Cited

U.S. PATENT DOCUMENTS

| | | | |
|---|---|---|---|
| 3,739,882 | 6/1973 | Schwenk et al. | 188/1 |
| 3,779,592 | 12/1973 | Golze et al. | 293/98 |
| 3,884,516 | 5/1975 | Gallion et al. | 293/69 |
| 4,325,574 | 4/1982 | Umemoto et al. | 293/120 |
| 4,350,378 | 9/1982 | Wakamatsu | 293/120 |
| 4,460,205 | 7/1984 | Glance | 293/120 |
| 4,569,865 | 2/1986 | Placek | 293/120 X |
| 4,598,001 | 7/1986 | Watanabe et al. | 293/120 X |
| 4,762,352 | 8/1988 | Enomoto | 293/120 |
| 4,830,416 | 5/1989 | Matsuoka | 293/120 |
| 5,071,500 | 12/1991 | Kumagai et al. | 156/152 |

FOREIGN PATENT DOCUMENTS

| | | |
|---|---|---|
| 2457676 | 6/1987 | Fed. Rep. of Germany . |
| 128732 | 6/1976 | Japan . |

Primary Examiner—Robert R. Song
Attorney, Agent, or Firm—Daniel M. Stock; Roger L. May

[57] ABSTRACT

A cross member bumper beam and method of making it are disclosed. The cross member bumper beam is attached to the frame rails of a vehicle. The beam is made of first and second materials that are bonded together with an adhesive. The first step of the method is to form a cross member from the first material. The cross member has a channel shape, with at least one bent return first edge portion. The bent return first edge portion includes a latch portion. The second step of the method is to attach the cross member to the frame rails of the vehicle. The channel shape of the cross member is oriented generally away from the frame rails and exposes the bent first edge portion. The third step of the method is to form a bumper facebar from the second material. The bumper facebar also has a channel shape with at least one bent return second edge portion. The bent return second edge portion includes an attachment portion. The fourth step of the methods is to position the bumper facebar so that the channel shape of the bumper facebar opens in a direction generally opposite to the channel shape of the cross member. The fifth step of the method is to apply the adhesive to at least one of the first and second edge portions. The sixth step of the method is to affix the first and second edge portions for bonding with the adhesive by engaging the attachment portion of the bumper facebar with the latch portion of the cross member.

29 Claims, 3 Drawing Sheets

METHOD FOR MAKING A BONDED VEHICULAR CROSS MEMBER BUMPER BEAM FROM TWO MATERIALS

TECHNICAL FIELD

This invention relates to vehicle bumpers, and, more particularly, to bonded bumper beams and methods for making them.

BACKGROUND ART

Bumpers have long been used on vehicles to absorb the impact from low speed collisions. The bumper absorbs the energy of the collision while the vehicle itself remains undamaged. Thus, after a collision, only the bumper needs to be replaced.

Early bumpers were provided with "collapsible zones" which dissipated the energy of collision by deforming upon impact. These early bumpers were usually metal.

Later, bumpers were designed to be made of less expensive materials and to dissipate the energy of collision without destroying the bumper, at least at relatively weak collision forces. Some bumpers have been designed to return to their original shape after collision and deformation. Bumpers have used a variety of means to dissipate collision energy.

The following patents are examples of relevant prior art as it relates to the present invention. U.S. Pat. No. 3,739,882 discloses a shock absorbing device having outer and inner sections and an intermediate section that operates between the inner and outer sections. The intermediate section contains an elastic material to absorb the collision force. The intermediate section returns to its original shape on a delayed basis.

U.S. Pat. No. 3,779,592 discloses a box beam bumper made of a pair of structural members formed from dissimilar metals. Two different metals are used to lower cost and bumper weight while still allowing for strength and resistance to deformation where needed. The dissimilar metals are joined by adhesive layers and/or non-conductive rivets. The dissimilar metals are not allowed to make galvanic contact with each other.

U.S. Pat. No. 3,884,516 discloses an impact-damping bumper comprising a rigid support member secured to a resilient member having high impact-damping capacity. The rigid and resilient members are secured to each other by screws.

U.S. Pat. No. 4,460,205 discloses yet another type of shock absorbing system. German Patent No. 24 57 676 discloses a bumper using rivets to connect a rigid support to a hollow molded plastic bumper strip. Slight impacts cause the non-riveted areas of the strip to bend over, without lasting damage. Only larger impacts shear the rivets, necessitating replacement.

Japanese Patent No. 62-128732 discloses an FRP (fiberglass reinforced plastic) box beam bumper made of two FRP channels joined together. This bumper beam is lightweight, elastic and inexpensive.

U.S. Pat. No. 4,762,352 discloses a vehicle bumper having a shock-absorbing member made of a foamed synthetic resin attached to a steel or FRP backup box beam.

Years of experience have shown that an ideal bumper beam should be lightweight and inexpensive, in addition to having good impact absorbing characteristics. This has led to the use of materials other than steel, for at least the impact absorbing portion of the bumper, as is disclosed in some of the above patents.

It is also sometimes desirable to have a bumper serve as a structural member of the vehicle. Of course, steel or some other strong substance is required for this. Thus, many modern bumpers have both structural and impact absorbing portions, again, as is disclosed in some of the above patents.

The non-steel portions of a bumper cannot be attached to a vehicle until certain operations are done to the car (i.e. oven bonding paint to the frame). This means that if a bumper is also to be used as a structural member of the car, that part of the bumper must be attached to the car early on in the assembly of the car while the other bumper beam components must be added later on.

The impact absorbing components are usually not steel. This reduces weight and cost and allows for the design and implementation of other specific desirable features and characteristics such as spoilers. The non-steel portions of the bumper have previously been bolted or riveted to the structural part of the bumper, near the end of the assembly process. This is inefficient and is not readily adaptable to robotic construction.

Thus, it has become desirable to develop a more efficient method of making a bumper for a vehicle, with structural and impact absorbing portions, where the structural portion of the bumper is attached to the vehicle early in assembly, while the impact absorbing and other portions of the bumper are attached later. This later attachment should be fast, inexpensive and adaptable to robotic installation. The present invention is directed, in part, to these needs.

SUMMARY OF THE INVENTION

An object of the present invention is to provide an improved method of making a cross member bumper beam that can be attached to the frame rails of a vehicle, with the beam being made of two dissimilar materials that are bonded together with an adhesive.

Another object of the present invention is to provide a more efficient method of attaching a cross member bumper beam to the frame rails of a vehicle wherein the structural part of the bumper is made of a strong, rigid material which is attached to the vehicle in the early stages of vehicle assembly, while the impact absorbing part of the bumper is made of less expensive and lighter materials and attached to the vehicle near the end of the assembly process.

Yet another object of the present invention is to provide a method of attaching the impact absorbing portion to the structural portion of a cross member bumper beam in a fast, efficient means that is easily adaptable to robotic installation.

In carrying out these and other objects of the invention, a method is disclosed for making a cross member bumper beam that can be attached to the frame rails of a vehicle. The beam is made of first and second materials that are bonded together with an adhesive. The first step of the method is to form a cross member from the first material. The cross member has a channel shape, with at least one bent return first edge portion. The bent return first edge portion includes a latch portion. The second step of the method is to attach the cross member to the frame rails of the vehicle. The channel shape of the cross member is oriented generally away from the frame rails and exposes the bent return first edge portion. The third step of the method is to form a bumper facebar from the second material. The bumper facebar also has a channel shape with at least one bent return second edge portion. The bent return second edge portion includes an attachment portion. The fourth step of the method is to position the bumper facebar so that the channel shape of the bumper facebar opens in a direction generally opposite to the channel shape of the cross member. The fifth step of the method is to apply the adhesive to at least one of the first and second edge portions. The sixth step of the method is to affix the first and second edge portions for bonding with the adhesive by engaging the attachment portion of the bumper facebar with the latch portion of the cross member.

The above objects and other objects, features, and advantages of the present invention are readily apparent from the following detailed description of the best mode for carrying out the invention, when taken in connection with the accompanying drawings.

BEST MODE FOR CARRYING OUT THE INVENTION

Figure 1:
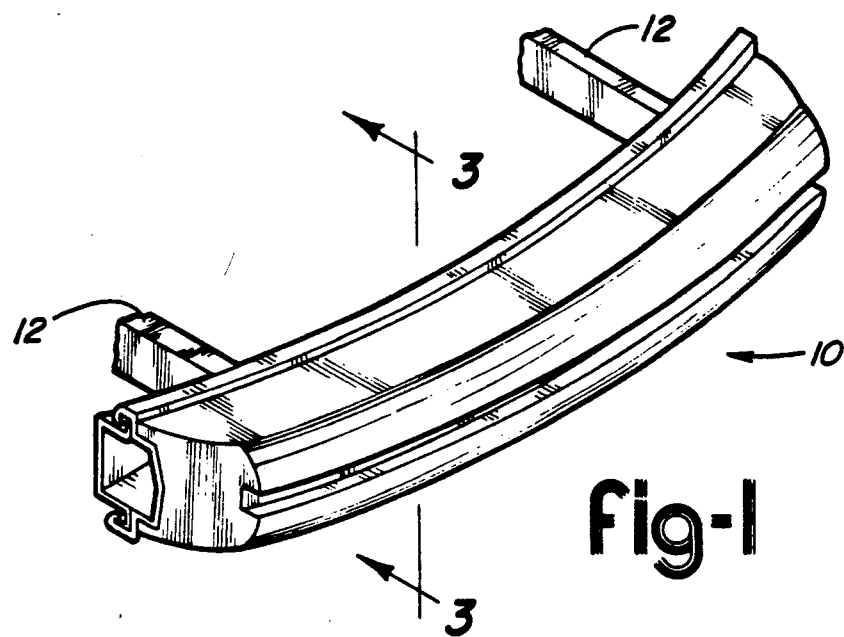
FIG. 1 is a perspective view of a cross member bumper beam made by the method of the present invention and mounted to the frame rails of a vehicle.
Figure 2:
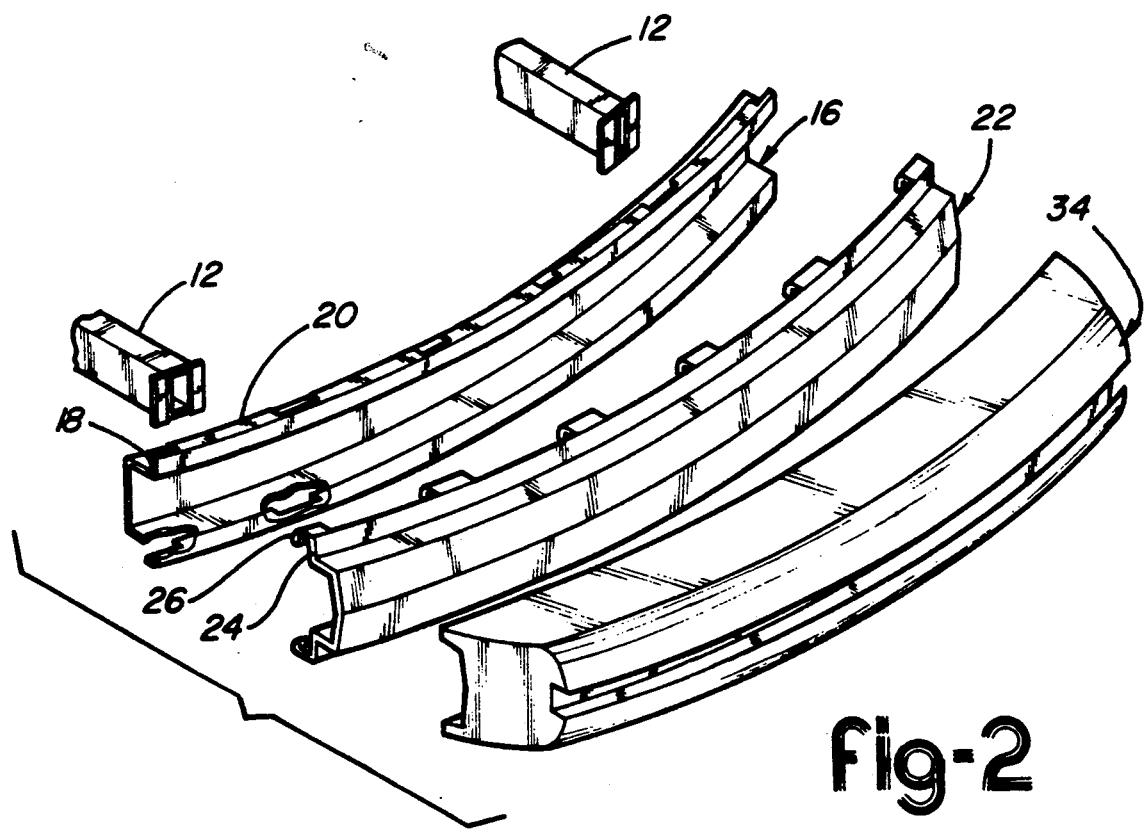
FIG. 2 is a perspective view of the primary parts used to manufacture a cross member bumper beam of the present invention, prior to assembly and oriented for proper assembly.
Figure 5:
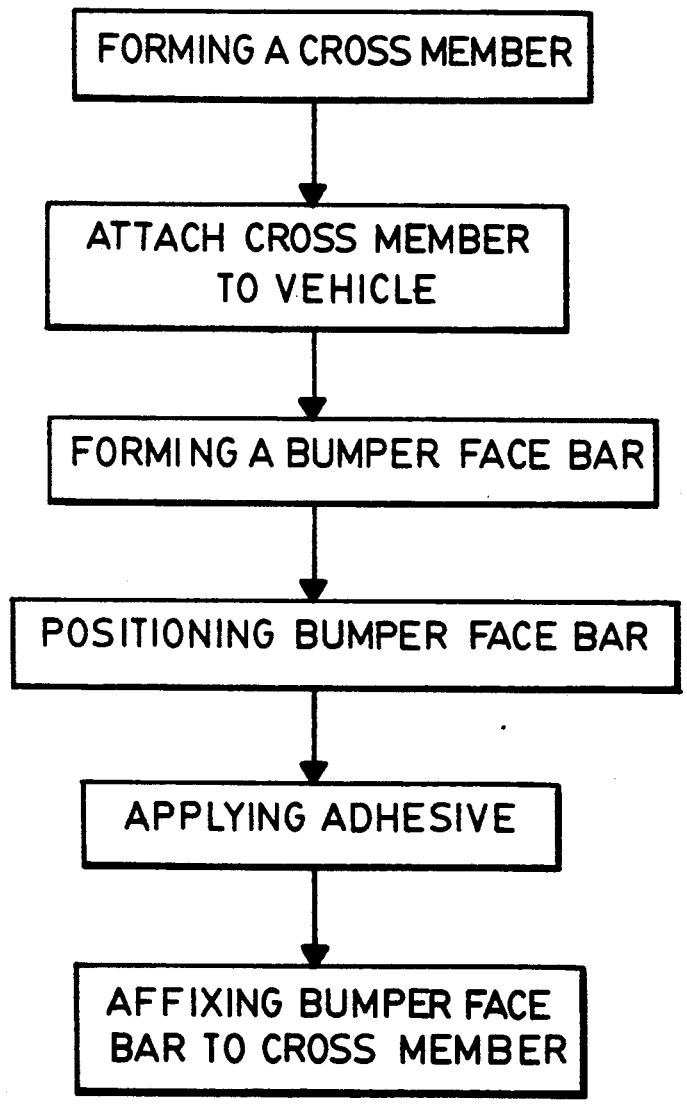
FIG. 5 is a block diagram of the method of the present invention to make a cross member bumper beam.

FIG. 1 shows cross member bumper beam 10 attached to the frame rails 12 of a vehicle 14 (not shown). FIG. 2 shows the primary parts used to manufacture cross member bumper beam 10 in accordance with the method of the present invention. The parts are oriented for proper assembly. FIG. 5 is a block diagram of the steps of the method of the present invention.

The first step of the method is to form cross member 16. Cross member 16 is shown in FIG. 2 and must be constructed of a first material that allows cross member 16 to act as a structural element of vehicle 14. Cross member 16 is formed in a channel shape and has an upper and lower bent return first edge portion 18, with each bent return first edge portion including a latch portion 20.

The second step of the method is to attach cross member 16 to frame rails 12 of vehicle 14. Attachment may be by any appropriate means. Cross member 16 is attached so that its channel shape is oriented generally away from frame rails 12 while exposing bent return first edge portion 18.

The third step of the method of the present invention is to form bumper facebar 22 from a second material. This second material is usually a lighter and less expensive material than the first material. It does not need to have the structural properties of the first material and usually does not. Bumper face-bar 22 is also formed in a channel shape, as shown in FIG. 2, and has an upper and lower bent return second edge portion 24, with each bent return second edge portion including an attachment portion 26.

Step four of the method of the present invention is to position bumper facebar 22 so that its channel shape opens in a direction generally opposite to the channel shape of cross member 16, as shown in FIG. 2.

The fifth step of the method of the present invention is to apply adhesive 28 to at least one of bent return first edge portions 18 and bent return second edge portions 24. The sixth and final step of the method of the present invention is to affix bent return first edge portion 18 to bent return second edge portion 24 for bonding with adhesive 28 by engaging attachment portion 26 with latch portion 20.

Figure 3:
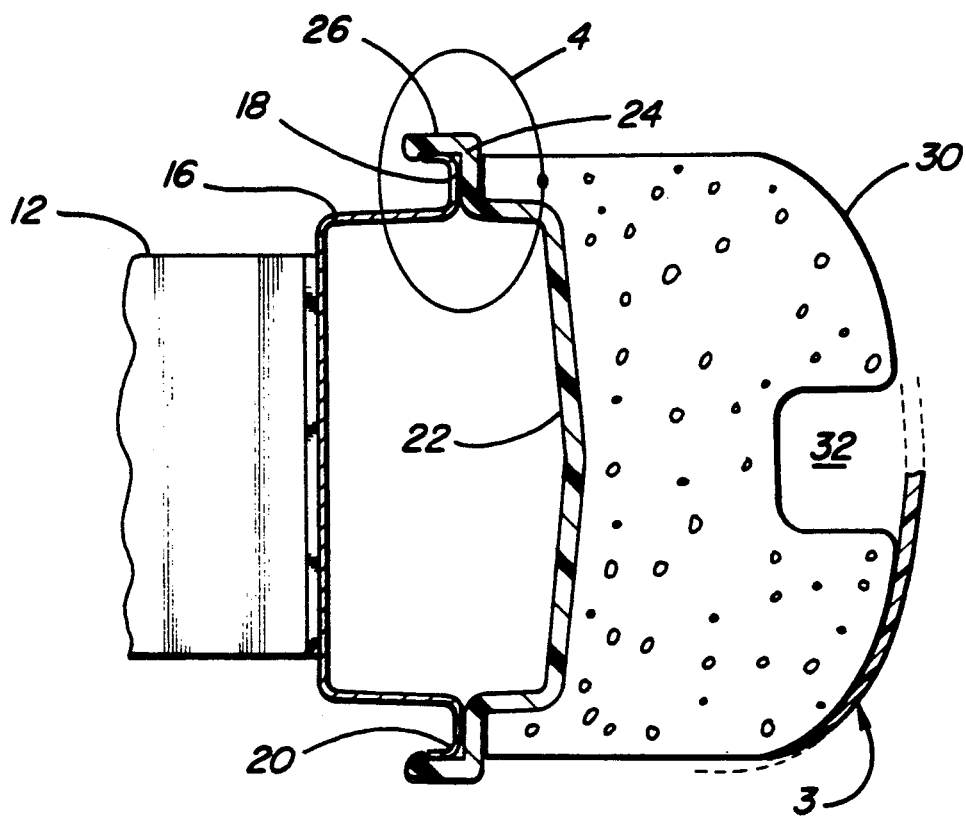
FIG. 3 is a cross-sectional view of a cross member bumper beam made by the method of the present invention, taken along axis 3—3, as shown in FIG. 1.
Figure 4:
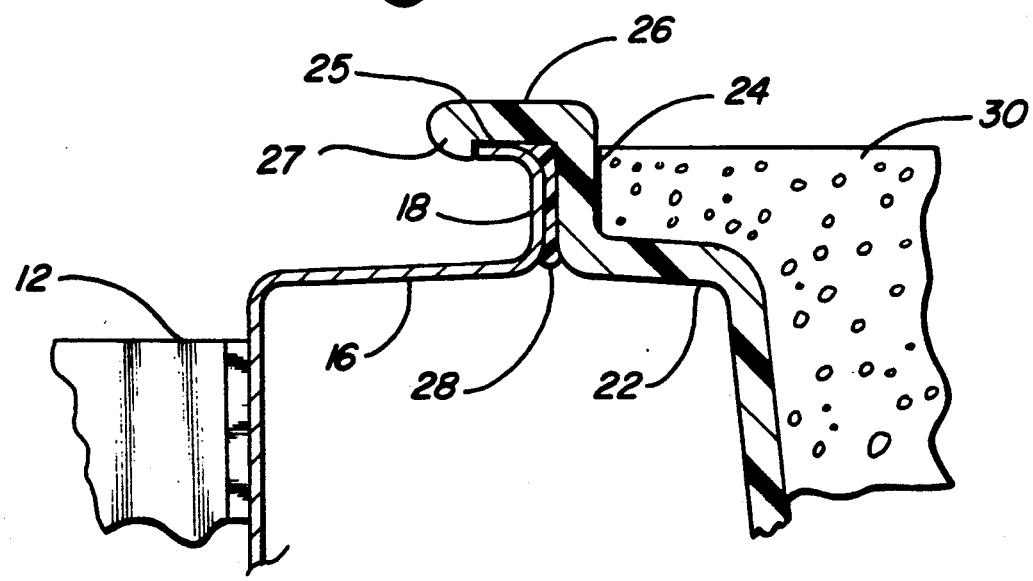
FIG. 4 is an expanded view of FIG. 3.

FIGS. 3 and 4 show a cross-sectional view of cross member bumper beam 10 attached to frame rails 12 and constructed in accordance with the method of the present invention. The method of the present invention is highly preferable to other methods of making or attaching bumper beams to vehicles that also serve as structural elements of the vehicle. No screws or rivets are required. Rather, all that is required is for an operator or robot to apply adhesive to the impact absorbing components of the bumper and snap them into place on the already assembled structural portion of the bumper. This later assembly can be done at any time, as may be appropriate to the vehicle in question.

Currently, in the preferred embodiment, the first material is metal and, preferably, some form of steel. Steel has the appropriate properties needed to act as a structural component of the car, is readily formed to any desired shape, and can easily be attached to frame rails 12. Nonetheless, the first material need not be metal, but could be any material having appropriate structural and other properties.

The second material is rarely steel, however, because many other suitable materials are less expensive and weigh less than steel. Aluminum and the light metals are possible, but, currently, various non-metallic materials are preferred.

Currently the non-metallic material is preferably a fiberglass reinforced plastic ("FRP"). FRP's are light and inexpensive while also having appropriate structural and other properties. The FRP may be constructed with the fibers all oriented in a particular direction to give bumper facebar 22 strength in a particular direction. Alternatively, the fibers in the FRP may be oriented in multiple layers with the fibers in each layer oriented in a specified manner to give bumper facebar 22 strength along several desired axes.

It is preferred, when affixing bent return first edge portion 18 to bent return second edge portion 24 for bonding with adhesive 28, to hold bent return first edge portion 18 and bent return second edge portion 24 together in compression, to allow adhesive 28 to cure and thereby bind bent return first edge portion 18 to bent return second edge portion 24, thereby binding cross member 16 to bumper facebar 22. Preferably, first and second edge portions 18 and 24 are held in compression by snapping latch portion 20 to attachment portion 26, as shown in FIG. 4. To assure the compressive hold, attachment portion 26 includes a channel 25 which provides a protruding lip 27. The width of the channel 25 is proportioned relative to the width of the latch portion 20 to provide that when the lip 27 snaps over latch portion 20, the adhesive 28 will be compressed between opposing edge portions 18 and 24. Furthermore, in the preferred embodiment, latch portion 20 is snapped to attachment portion 26 along the neutral axis of the box beam formed by cross member 16 and bypass facebar 22, as shown in FIG. 3. This minimizes the effect of forces to separate the bonding area during curing of adhesive 28.

Adhesive 28 may be any appropriate adhesive but is generally a urethane or epoxy adhesive. Other adhesives are certainly known in the art and possible.

Currently, an energy absorber 30 is almost always added to bumper facebar 22, as shown in FIGS. 2-4. Energy absorber 30 is added to bumper facebar 22 on the side of bumper facebar 22 that is opposite to the direction in which the channel of bumper facebar 22 opens. Preferably, energy absorber 30 is constructed of polypropylene or urethane foam. Honeycomb construction and other energy absorbing constructions are possible and well known in the art. Energy absorber 30 may contain hollow cavity 32 to enhance the energy absorbing characteristics of energy absorber 30.

Currently also, fascia cover 34 is added over energy absorber 30, as shown in FIGS. 2-4. Fascia cover 34 may include a spoiler or other sections, as is well known in the prior art.

While the best mode for carrying out the invention has been described in detail, those familiar with the art to which this invention relates will recognize various alternative designs and embodiments for practicing the invention as defined by the following claims.

I claim:

1. A method of making a cross member bumper beam that can be attached to the frame rails of a vehicle, with the beam being made of first and second materials that are bonded together with an adhesive, the method comprising the steps of:

forming a cross member from the first material, the cross member having a channel shape having at least one bent return first edge portion which includes a latch portion;

attaching the cross member to the frame rails of the vehicle so that the channel shape of the cross member is oriented generally away from the frame rails while exposing the bent first edge portion;

forming a bumper facebar from the second material, the bumper facebar having a channel shape and having at least one bent return second edge portion which includes an attachment portion;

positioning the bumper facebar so that the channel shape of the bumper facebar opens in a direction generally opposite to the channel shape of the cross member;

applying the adhesive to at least one of the first and second edge portions; and affixing the first and second edge portions for bonding with the adhesive by engaging the attachment portion of the bumper facebar with the latch portion of the cross member.

2. The method of claim 1, wherein the first material is metal and the second material is not metal.

3. The method of claim 2, wherein the step of forming the cross member with at least one bent return first edge portion further comprises forming exactly two bent return first edge portions.

4. The method of claim 3, wherein the step of forming the bumper facebar with at least one bent return second edge portion further comprises forming exactly two bent return second edge portions.

5. The method of claim 4, wherein the step of affixing the first and second edge portions for bonding with the adhesive further comprises holding the first and second edge portions together in compression to allow the adhesive to cure and thereby bond the cross member to the bumper facebar.

6. The method of claim 5, wherein the step of holding the first and second edge portions together in compression further comprises snapping the latch portion to the attachment portion.

7. The method of claim 6, wherein the step of snapping the latch portion to the attachment portion further comprises snapping the latch portion to the attachment portion along the neutral axis between the cross member and the bumper facebar.

8. The method of claim 2, wherein the non-metallic material is a fiberglass reinforced plastic material ("FRP").

9. The method of claim 8, wherein the FRP is constructed with the fibers all oriented in a particular direction to give the bumper facebar strength along a desired axis.

10. The method of claim 8, wherein the FRP is constructed of multiple layers of fibers with the fibers in each layer oriented in a specified manner to give the bumper facebar strength along several axes.

11. The method of claim 1, wherein the step of fixing the first and second edge portions for bonding with the adhesive includes using a urethane or epoxy adhesive.

12. The method of claim 1, including the further step of adding an energy absorber to the bumper facebar on the side of the bumper facebar that is opposite to the direction in which the channel of the bumper facebar opens.

13. The method of claim 12, wherein the energy absorber is constructed of polypropylene or urethane foam.

14. The method of claim 13, wherein the energy absorber contains a hollow cavity to enhance the energy absorbing characteristics of the energy absorber.

15. The method of claim 12, wherein the energy absorber is constructed as a honeycomb.

16. The method of claim 12, including the further step of adding a fascia cover to the energy absorber on the side of the cross member bumper beam that is oriented away from the side frame rails of the vehicle.

17. A cross member bumper beam that can be attached to the frame rails of a vehicle, with the beam being made of first and second materials, the beam comprising:

a cross member formed from the first material for attachment to the frame rails of the vehicle, the cross member having a channel shape having at least one bent return first edge portion which includes a latch portion, the channel shape being oriented generally away from the frame rails of the vehicle while exposing the bent first edge portion;

a bumper facebar formed from the second material having a channel shape having at least one bent return second edge portion which includes a latch portion, the bumper facebar being oriented so that its channel shape opens in a direction generally opposite to the channel shape of the cross member; and adhesive located between and contacting the first and second edge portions to bond the bumper facebar to the cross member when the latch portion is snapped to the attachment portion to hold the bumper facebar to the cross member while the adhesive cures.

18. The cross member bumper beam of claim 17, wherein the first material is metal and the second material is not metal.

19. The cross member bumper beam of claim 18, wherein the cross member has exactly two bent return first edge portions.

20. The cross member bumper beam of claim 19, wherein the bumper facebar has exactly two bent return second edge portions.

21. The cross member bumper beam of claim 20, wherein the non-metallic material is a fiberglass reinforced plastic material ("FRP").

22. The cross member bumper beam of claim 21, wherein the FRP is constructed with the fibers all oriented in a particular direction to give the bumper facebar strength along a desired axis.

23. The cross member bumper beam of claim 21, wherein the FRP is constructed of multiple layers of fibers with the fibers in each layer oriented in a specified manner to give the bumper facebar strength along several axis.

24. The cross member bumper beam of claim 17, further comprising an energy absorber attached to the bumper facebar on the side of the bumper facebar that is opposite to the direction in which the channel of the bumper facebar opens.

25. The cross member bumper beam of claim 24, wherein the energy absorber is constructed of polypropylene or urethane foam.

26. The cross member bumper beam of claim 25, wherein the energy absorber contains a hollow cavity to enhance the energy absorbing characteristics of the energy absorber.

27. The cross member bumper beam of claim 25, wherein the energy absorber is constructed as a honeycomb.

28. The cross member bumper beam of claim 25, further comprising a fascia cover attached to the energy absorber on the side of the cross member bumper beam that is oriented away from the side frame rails of the vehicle.

29. A method of making a cross member bumper beam that can be attached to the frame rails of a vehicle, with the beam being made of first and second materials that are bonded together with an adhesive, the method comprising the steps of:

forming a cross member from the first material having an upper bent return first edge portion and a lower bent return first edge portion, each first edge portion extending generally transversely of the frame rails and including a respective latch portion;

attaching the cross member to the frame rails of the vehicle while exposing the first upper edge portions above the frame rails and exposing the lower first edge portion below the frame rails;

forming a bumper facebar from the second material, the bumper facebar having an upper bent return second edge portion and a lower bent return second edge portion, each second edge portion extending generally transversely of the frame rails and including a respective attachment portion;

at least one of the cross member and bumper facebar being channel-shaped in cross-section;

positioning the bumper facebar so that the channel shape of said at least one of the cross member and bumper facebar opens in a direction generally opposite to the other of the cross member and bumper facebar;

applying the adhesive to at least one of the first and second edge portions; and affixing the first and second edge portions for bonding with the adhesive by engaging the attachment portion of the bumper facebar with the latch portion of the cross member, thereby providing a structurally unified composite bumper beam having a cavity in cross-section as provided by the channel-shaped member and extending transversely between the frame rails to thus provide a bumper beam highly resistant to bending.

* * * * *